US012380827B2

(12) United States Patent
Jo

(10) Patent No.: US 12,380,827 B2
(45) Date of Patent: Aug. 5, 2025

(54) DISPLAY DEVICE AND OPERATION METHOD THEREOF

(71) Applicant: LG ELECTRONICS INC., Seoul (KR)

(72) Inventor: Yong Jae Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 18/203,283

(22) Filed: May 30, 2023

(65) Prior Publication Data

US 2024/0233595 A1 Jul. 11, 2024

(30) Foreign Application Priority Data

Jan. 10, 2023 (KR) ........................ 10-2023-0003303

(51) Int. Cl.
*G09G 3/20* (2006.01)

(52) U.S. Cl.
CPC ... *G09G 3/2003* (2013.01); *G09G 2320/0242* (2013.01); *G09G 2320/0666* (2013.01); *G09G 2330/021* (2013.01); *G09G 2360/16* (2013.01)

(58) Field of Classification Search
CPC .......... G09G 3/2003; G09G 5/02; G09G 5/06; G09G 2360/0666; G09G 2360/16; G09G 2320/0673; H04N 23/86
See application file for complete search history.

(56) References Cited

U.S. PATENT DOCUMENTS

| | | | | |
|---|---|---|---|---|
| 10,380,936 | B2 * | 8/2019 | Nose | G09G 5/06 |
| 2015/0109356 | A1 | 4/2015 | Yata et al. | |
| 2015/0312542 | A1 * | 10/2015 | Suginohara | H04N 9/67 345/603 |
| 2019/0206364 | A1 | 7/2019 | Jeong et al. | |

FOREIGN PATENT DOCUMENTS

| | | |
|---|---|---|
| EP | 4006823 | 6/2022 |
| KR | 10-2012-0134218 | 12/2012 |
| KR | 101287481 | 7/2013 |
| KR | 10-2016-0035192 | 3/2016 |

OTHER PUBLICATIONS

European Patent Office Application Serial No. 23212199.6, Search Report dated May 31, 2024, 14 pages.
Korean Intellectual Property Office Application No. 10-2023-0003303, Notice of Allowance dated Dec. 16, 2024, 2 pages.

* cited by examiner

*Primary Examiner* — Antonio A Caschera
(74) *Attorney, Agent, or Firm* — LEE, HONG, DEGERMAN, KANG & WAIMEY

(57) ABSTRACT

According to an embodiment, a display device includes a controller that performs conversion of RGB data of an input image based on an RGB curve, and a display that outputs an image with RGB data converted based on the RGB curve, wherein the controller may apply different RGB curves to each pixel according to saturation information of each of pixels of the input image.

8 Claims, 10 Drawing Sheets

DISPLAY DEVICE AND OPERATION METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2023-0003303, filed on Jan. 10, 2023, the contents of which are hereby incorporated by reference herein in its entirety.

BACKGROUND OF THE INVENTION

1. Field of the Invention

The present disclosure relates to a display device and an operation method thereof.

2. Discussion of the Related Art

Display devices are becoming more diverse, such as not only TVs, but also mobile phones, tablet PCs, personal PCs, and wearable devices, and their demand is continuously increasing. Accordingly, users' desire for image quality of a display device tends to continues to increase without stopping.

Furthermore, the display device not only provides hardware-side technologies such as an increase in resolution, but also software-side technologies such as improvement in contrast ratio and improvement in brightness.

However, it cannot be said that the higher the brightness of an image, the better in relation to the improvement in brightness. When an image is too bright, the visibility of the image may deteriorate or the color of the image may not be expressed properly.

In addition, when the output of the entire image is increased for enhancement in brightness, the power consumption of all pixels increases, causing a disadvantage in that the power consumption increases excessively compared to the improvement in brightness.

SUMMARY OF THE INVENTION

An object of the present disclosure is to provide a display device and a method of operating the display device which prevent an excessive increase in power consumption while improving a brightness improvement effect actually felt by a user.

An object of the present disclosure is to provide a display device with improved brightness of an output image regardless of specifications and an operation method thereof.

According to an embodiment of the present disclosure, a display device includes a controller configured to perform conversion of RGB data of an input image based on an RGB curve and a display configured to output an image with RGB data converted based on the RGB curve, wherein the controller may apply different RGB curves to each pixel according to saturation information of each of pixels of the input image.

The controller may apply an RGB curve that is more convex upward as saturation decreases when an x-axis of the RGB curve is an input and a y-axis of the RGB curve is an output.

The controller may apply an RGB curve in which an output is higher than an input as saturation decreases.

The controller may calculate a saturation level for each pixel of the input image with the saturation information, and apply different RGB curves according to the saturation level.

The controller may calculate a value obtained by dividing a maximum value by a minimum value among an R value, a G value, and a B value as the saturation level.

The controller may apply a first RGB curve to a first pixel having a first level as the saturation level and applying a second RGB curve to a second pixel having a second level as the saturation level, and an output of the first RGB curve may be greater than an output of the second RGB curve when the first level is lower than the second level.

The controller may calculate a value obtained by dividing a minimum value by a maximum value among an R value, a G value, and a B value as the saturation level.

The controller may apply an RGB curve whose output is higher than an input to the first pixel, and an RGB curve whose output is the same as the input to the second pixel, according to the saturation information.

The controller may output an image in which an amount of increase in brightness of an output is larger compared to that of an input as the saturation decreases, and the amount of increase in brightness of the output is smaller compared to that of the input as the saturation increases.

According to the embodiments of the present disclosure, the amount of increase of brightness for each pixel may vary according to the saturation information, resulting in an advantage in that the brightness enhancement effect perceived by the user is higher than the case where the entire image is equally bright.

According to an embodiment of the present disclosure, the amount of increase of brightness for each pixel may vary according to the saturation information, thus minimizing the increase in power consumption compared to the case where the entire image is equally bright.

According to an embodiment of the present disclosure, an image is output with RGB data converted according to different RGB curves for pixels, thus improving brightness more precisely compared to image processing for each block.

According to an embodiment of the present disclosure, image processing is performed using RGB data, resulting in enhancement in brightness of an output image regardless of specifications.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
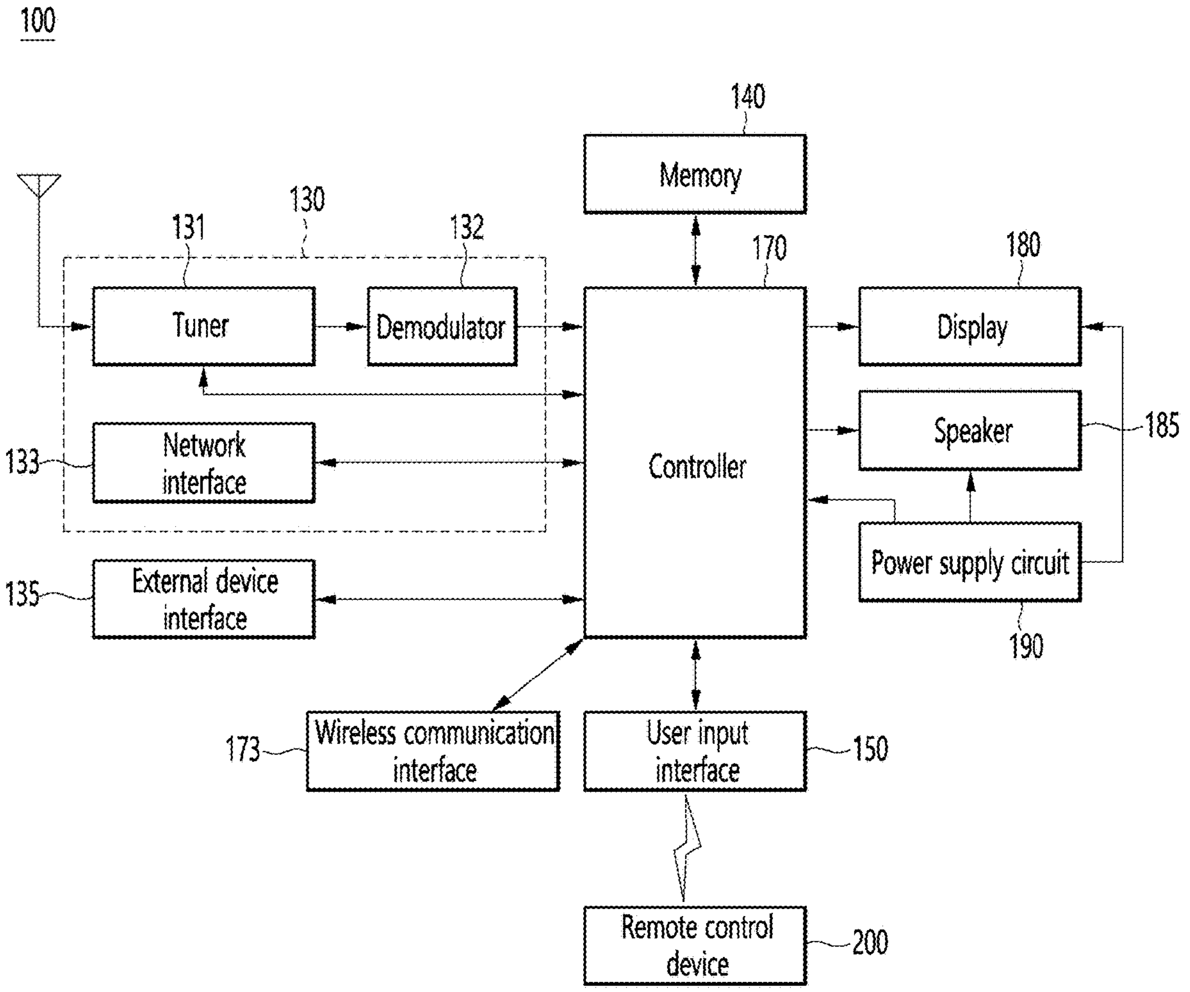
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the speaker 185.

Next, a remote control device according to an embodiment of the present disclosure will be described with reference to FIGS. 2 to 3.

Figure 2:
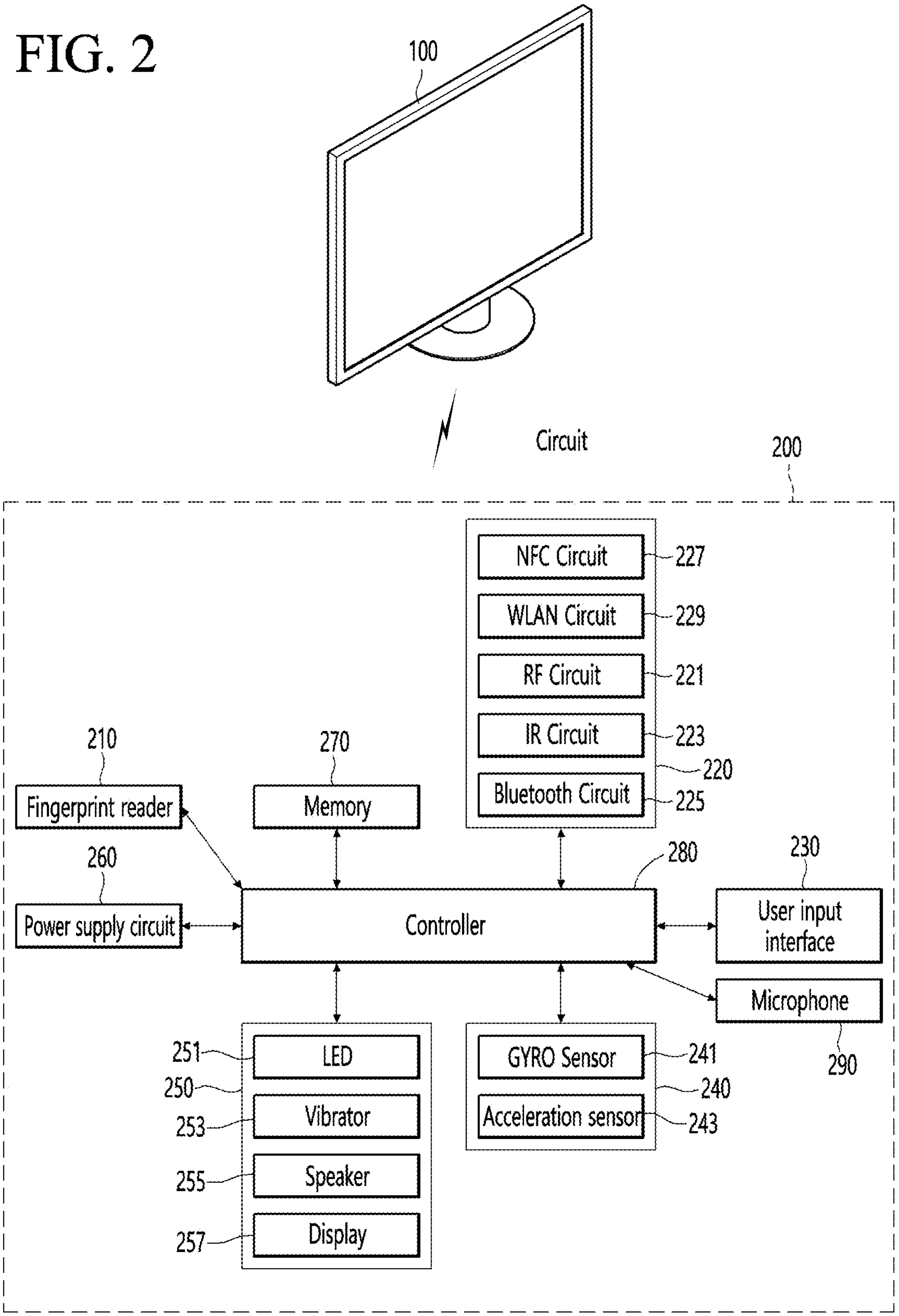
FIG. 2 is a block diagram illustrating a remote control device according to an embodiment of the present disclosure.
Figure 3:
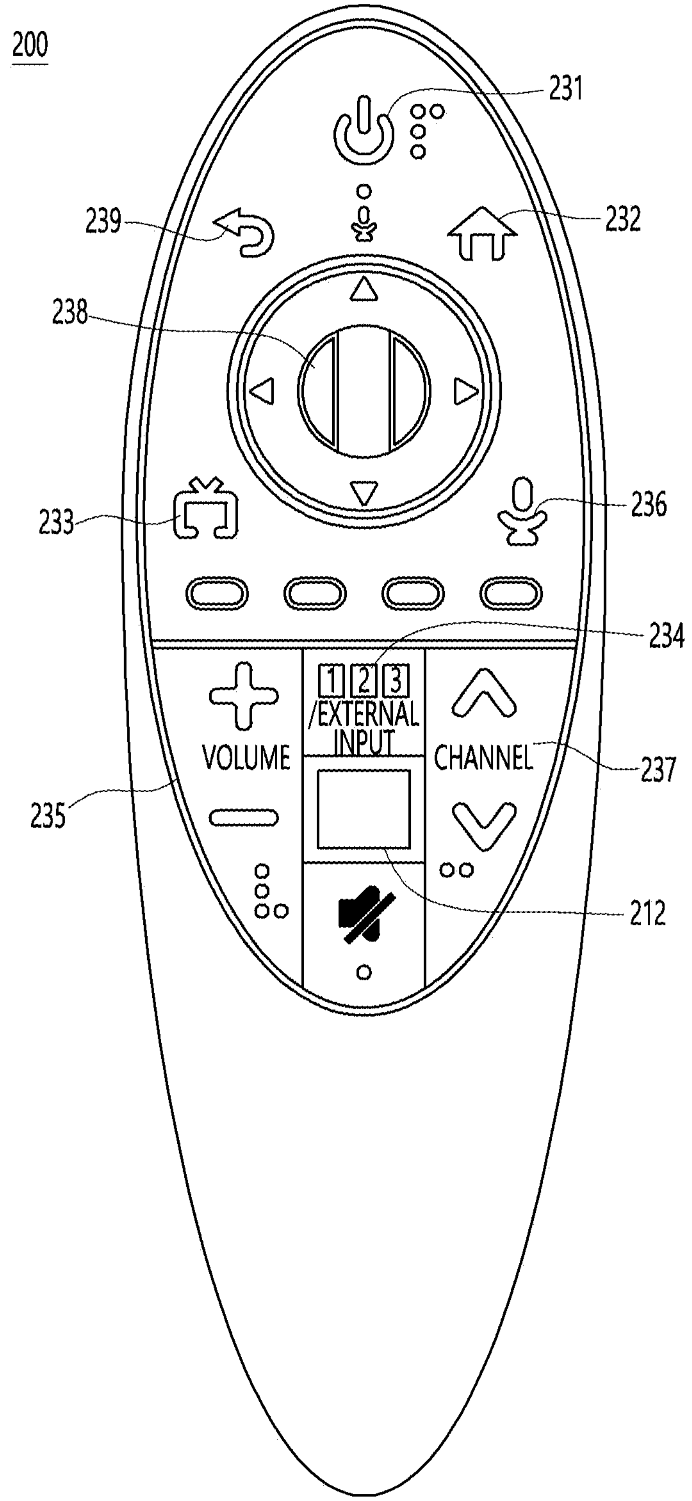
FIG. 3 shows an example of an actual configuration of a remote control device 200 according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
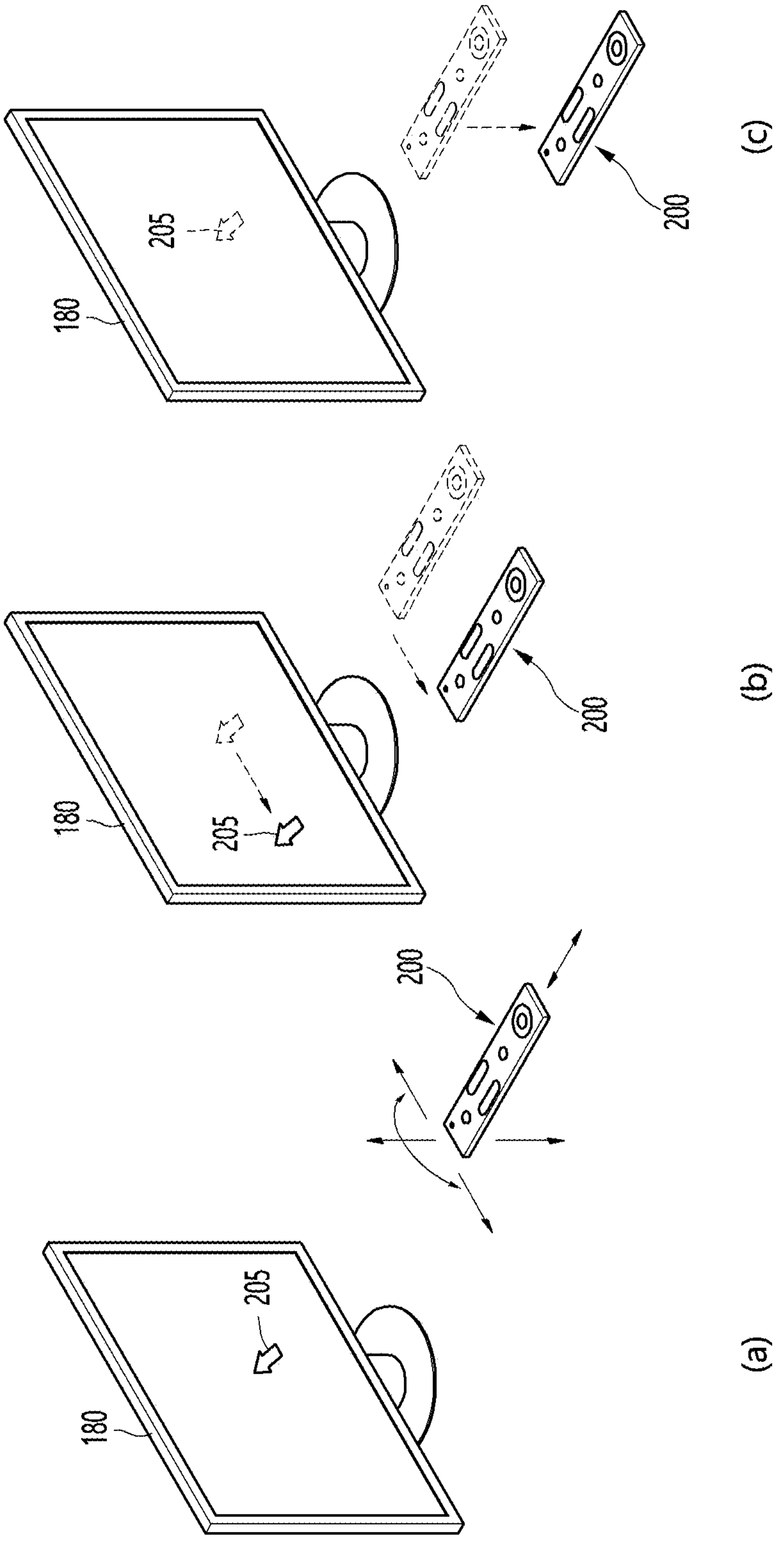
FIG. 4 is a view of utilizing a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Meanwhile, the display device 100 may perform various image processing to improve picture quality.

Specifically, as an example of a method for increasing a contrast ratio, the controller 170 may divide an image into a plurality of blocks and then perform image processing (called Local Contrast) to differently adjust the brightness of each block based on the average picture level (APL) of each block.

In addition, as an example of a method for reducing color difference between models of the display device 100, the controller 170 may perform image processing for conversion of RGB data of an input image using an RGB curve obtained by mapping input RGB data and output RGB data. This may be referred to as gamut mapping. In this case, the input RGB data represents an R value, a G value, and a B value of each pixel of the input image, and the output RGB represents the R value, G value, and B value of each pixel of an image output through the display 180.

Figure 5:
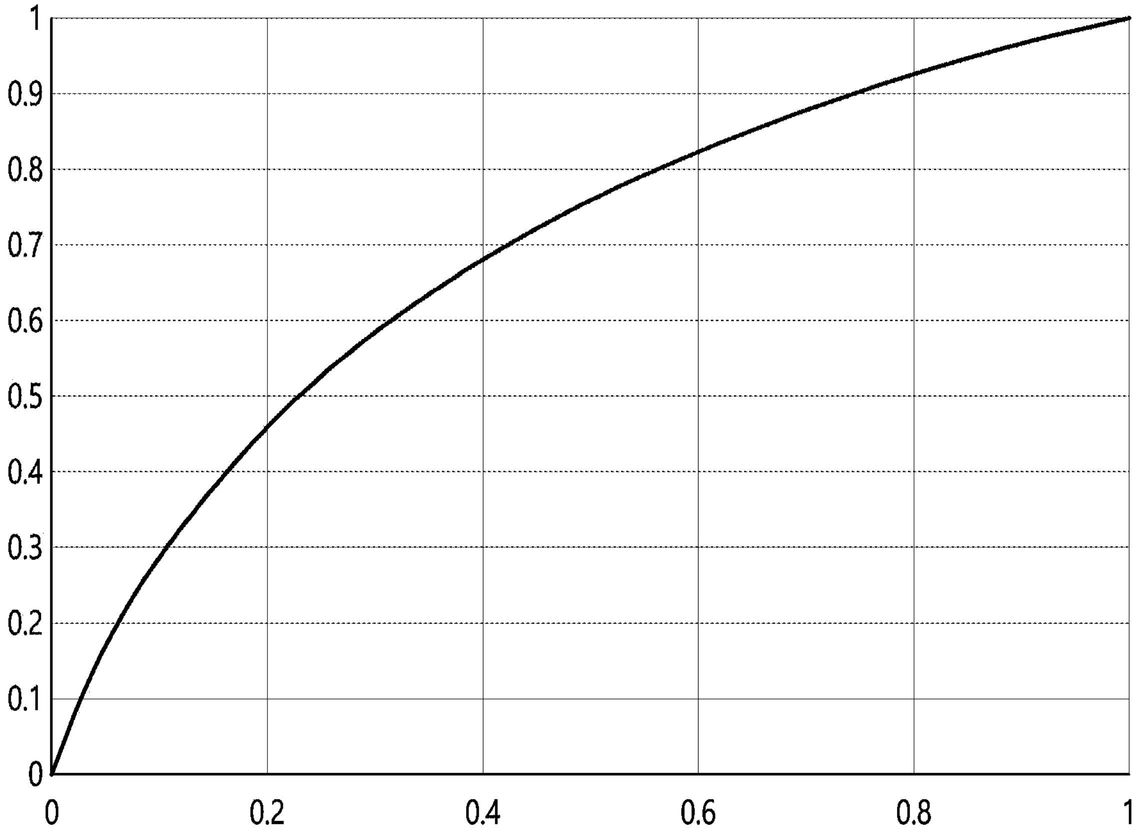
FIG. 5 is an exemplary diagram illustrating an RGB curve applied for image processing in a conventional display device.

FIG. 5 is an exemplary diagram illustrating an RGB curve applied for image processing in a conventional display device.

Conventionally, a display device 100 may perform conversion of RGB data of an input image using a single RGB curve alone as shown in FIG. 5.

With regard to the RGB curve shown in FIG. 5, the RGB curve is image processing for gamut mapping, but there is also an effect in which the image is brightened because an output is high than an input.

However, in this case, since the output of the entire image is increased, the brightness enhancement effect that the user actually feels may be somewhat lowered compared to the amount of increase in the output compared to the input. In addition, since the output of the entire image is increased, there is a disadvantage in that power consumption is excessively increased.

Accordingly, an object of the present disclosure is to provide a display device and a method of operating the display device which prevent an excessive increase in power consumption while improving a brightness enhancement effect actually felt by a user.

Specifically, it is said that humans have a characteristic of feeling the brightness enhancement effect better when the brightness of a light-colored part (low-saturation part) is increased than when the brightness of a dark-colored part (high-saturation part) is increased. According to the present disclosure, the brightness enhancement effect may be increased by differently setting an amount of increase in brightness for each pixel using the above-described characteristics, and at the same time, power consumption may be reduced compared to when the brightness of all pixels is equally increased.

Figure 6:
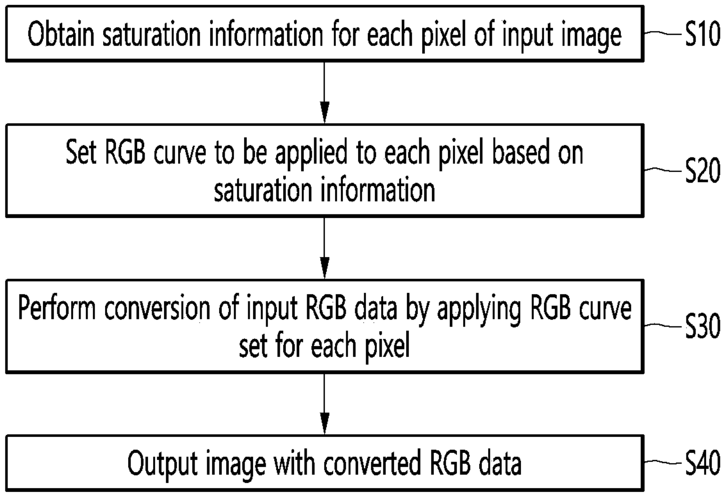
FIG. 6 is a flowchart illustrating a method of operating a display device according to an embodiment of the present disclosure.

FIG. 6 is a flowchart illustrating a method of operating a display device according to an embodiment of the present disclosure.

The controller 170 may obtain saturation information for each of pixels of an input image (S10).

The controller 170 may receive an input image and obtain RGB data of the input image. The RGB data of the input image may include RGB data for all frames of the input image, and the RGB data may include an R value, a G value, and a B value for each pixel of each frame.

Saturation information is information representing the vividness of color. In the present disclosure, the saturation information may include all information capable of distinguishing color vividness. Accordingly, the saturation information may be diverse. The controller 170 may obtain saturation information in various ways.

According to an embodiment, the controller 170 may calculate a saturation level for each of pixels of the input image using the saturation information. The saturation level may indicate whether the color is dark or light with a numerical value in a range of 0 to 1. The saturation level may also be calculated in various ways.

For example, the controller 170 may calculate a value obtained by dividing the maximum value among the R value, G value, and B value by the minimum value as the saturation level. That is, the controller 170 may calculate MAX RGB/MIN RGB as the saturation level. In this case, the lower saturation level is calculated as color is more achromatic, and the higher saturation level is calculated as color is more chromatic. Accordingly, there is an advantage in that the vividness of color may be intuitively understood through the saturation level. However, in this case, MIN RGB may be 0, and when the denominator is 0, another method for calculating the saturation level is required.

As another example, the controller 170 may calculate a value obtained by dividing the minimum value among the R value, the G value, and the B value by the maximum value as the saturation level. That is, the controller 170 may calculate MIN RGB/MAX RGB as the saturation level. In this case, the higher saturation level is calculated as color is more achromatic, and the lower saturation level is calculated as color is more chromatic. Therefore, it should be understood that the higher the saturation level, the lighter the color. However, a case where only MAX RGB, that is, the denominator is 0 does not occur, and thus, there is an advantage in that the saturation level calculation method is simplified.

According to another embodiment, the controller 170 may calculate a saturation value according to a predetermined calculation formula based on saturation information. The predetermined calculation formula may be as follows. That is, when R'=R/255, G'-G/255, B'=B/255, Cmax=max (R', G', B'), Cmin=min (R', G', B'), Δ=Cmax−Cmin. When Cmax=0, saturation S is 0 (S=0), and when Cmax≠0, saturation is Δ/Cmax (S=Δ/Cmax). In this case, there is an advantage in that accuracy of saturation information is improved compared to the above-described case of calculating a saturation level. However, there is a disadvantage in that the time and load needed to obtain saturation information increases.

Meanwhile, the above-described methods are merely examples, and the controller 170 may obtain saturation information in various ways.

The controller 170 may set an RGB curve to be applied to each pixel based on the saturation information (S20).

The memory 140 may store a plurality of RGB curves. That is, the memory 140 may store a plurality of RGB curves in which the output RGB is differently mapped to the input RGB although the input RGB is the same. The number of RGB curves may be 12, but it should be noted that this is only an example and is not limited thereto.

The controller 170 may set an RGB curve to be applied to each pixel to one of the plurality of RGB curves stored in the memory 140 based on the saturation information.

The controller 170 may set an RGB curve for each pixel. The controller 170 may set an RGB curve for each pixel based on saturation information of each pixel.

When it is assumed that, in the RGB curve, the x-axis (horizontal axis) is an input and the y-axis (vertical axis) is output, the controller 170 may set the RGB curve to be more convex upward as the saturation decreases. That is, the controller 170 may perform conversion of RGB data by applying an RGB curve that is more convex upward as the saturation decreases.

When the saturation information represents a saturation level, the controller 170 may perform conversion of RGB data by applying different RGB curves according to saturation levels.

When the saturation level is MAX RGB/MIN RGB, the controller 170 may apply a first RGB curve to a first pixel having a first level as the saturation level and a second RGB curve to a second pixel having a second level as the saturation level, and when the first level is lower than the second level, the output of the first RGB curve may be greater than the output of the second RGB curve.

Meanwhile, When the saturation level is MIN RGB/MAX RGB, the controller 170 may apply a first RGB curve to a first pixel having a first level as the saturation level and a second RGB curve to a second pixel having a second level as the saturation level, and when the first level is lower than the second level, the output of the first RGB curve may be smaller than the output of the second RGB curve.

The controller 170 may set an RGB curve whose the output is higher than the input, as the saturation is lower.

Specifically, the controller 170 may set an RGB curve in which the amount of increase in brightness of the output compared to the input is larger as the saturation decreases, and the amount of increase in brightness of the output compared to the input is smaller as the saturation increases.

The controller 170 may set an RGB curve in which the amount of increase in RGB data of the output compared to the input is larger as the saturation decreases, and the amount of increase in RGB data of the output compared to the input is smaller as the saturation increases.

That is, the output may be greater than or equal to the input in all of the plurality of RGB curves stored in the memory 140. However, the plurality of RGB curves may have different differences between the output and the input. Accordingly, the controller 170 may select an RGB curve such that at least the output brightness is the same as the input brightness, or an RGB curve such that the output brightness is greater than the input brightness. The controller 170 may set an RGB curve in a direction in which the brightness of the output is greater than the brightness of the input as the saturation decreases.

The controller 170 may convert the input RGB data by applying an RGB curve set to each pixel (S30).

Figure 7:
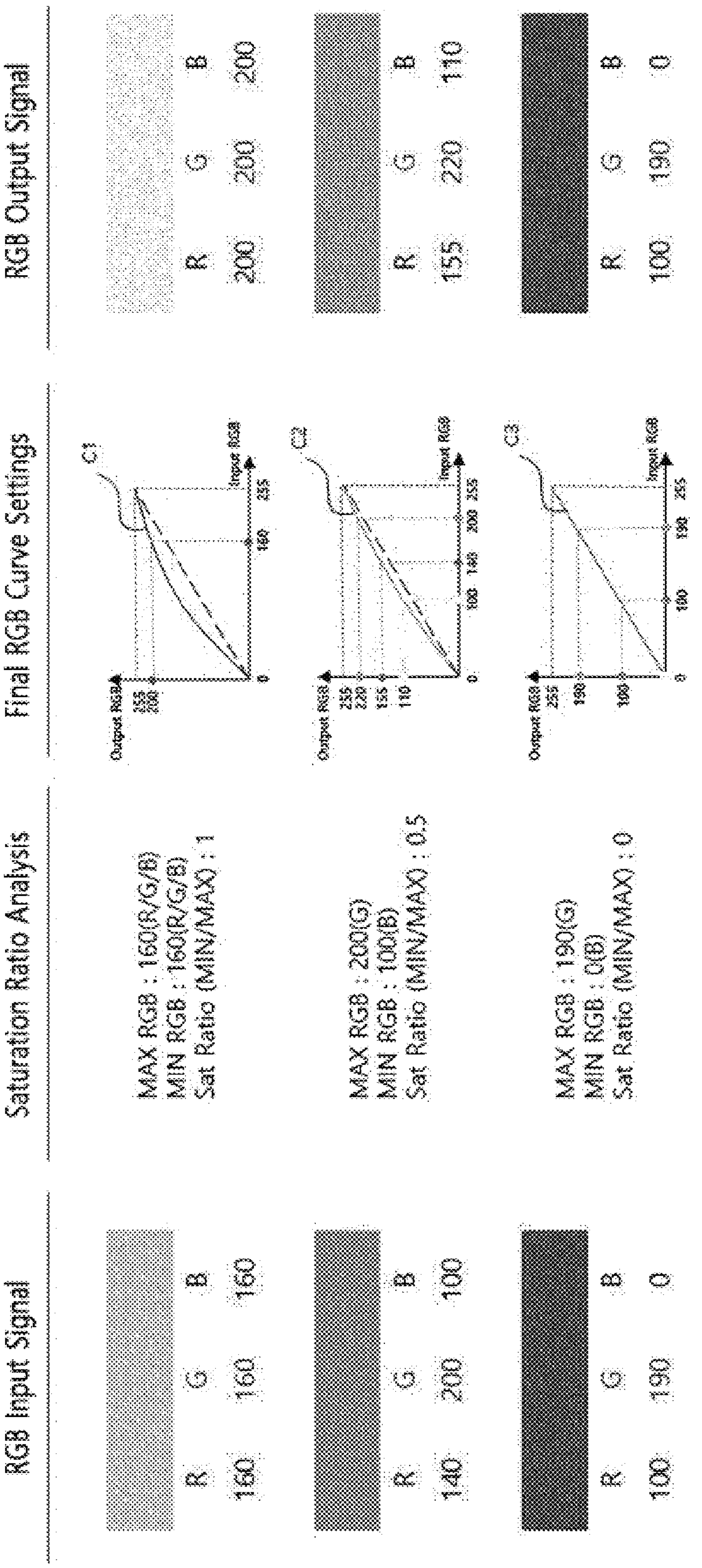
FIG. 7 is a diagram for describing a method of setting an RGB curve based on saturation information in a display device according to an embodiment of the present disclosure.

FIG. 7 is a diagram for describing a method of setting an RGB curve based on saturation information in a display device according to an embodiment of the present disclosure.

Referring to an RGB input signal, the R value, G value, and B value of a first pixel of an input image may be 160, 160, and 160, respectively, the R value, G value, and B value of a second pixel may be 140, 200, and 100, respectively, and the R value, G value, and B value of a third pixel may be 100, 190, and 0, respectively. This is merely an example for convenience of description. Also, for convenience of description, only three pixels will be described.

The MAX RGB (maximum value of R value, G value, and B value) and MIN RGB (minimum value of R value, G value, and B value) of the first pixel may be 160 and 160, respectively. The MAX RGB (maximum value among R value, G value, and B value) and MIN RGB (minimum value among R value, G value, and B value) of the second pixel may be 200 and 100, respectively. The MAX RGB (maximum value among R, G, and B values) and MIN RGB (minimum value among R, G, and B values) of the third pixel may be 190 and 0, respectively.

When the controller 170 obtains the saturation level by dividing the minimum value by the maximum value among the R, G, and B values as the saturation information, the saturation levels of the first to third pixels may be 1, 0.5, and 0, respectively. According to the above calculation method, 1 may be the maximum value of the saturation level and 0 may be the minimum value of the saturation level.

The controller 170 may set an RGB curve to be applied to each pixel based on the saturation level. For example, the controller 170 mat set an RGB curve to be applied to the first pixel as a first curve C1, set an RGB curve to be applied to the second pixel as a second curve C2, and set an RGB curve to be applied to the third pixel as a third curve C3.

It can be seen form the first to third curves C1 to C3 shown in FIG. 7 that the first curve C1 is the most convex upward, the second curve C2 is the next most convex upward, and the third curve C3 is flat. The third curve C3 may be a bypass curve. That is, as the higher the saturation level (the lower the saturation), the more convex upward curve is selected as the curve to be applied to a corresponding pixel, and the lower the saturation level (the higher the saturation), the flatter the curve may be selected as a curve to be applied to a corresponding pixel. When the saturation level is the minimum value, the output may be the same as the input. Accordingly, the controller 170 may apply an RGB curve whose output is higher than an input to the first pixel, and an RGB curve whose output is the same as the input to the second pixel, according to the saturation information.

An RGB output signal shown in FIG. 7 may represent output R, G, and B values obtained by converting input R, G, and B values of the first to third pixels by an RGB curve. That is, the output R, G, and B values of the first pixel may be converted into 200, 200, and 200 by the first curve C1. The output R, G, and B values of the second pixel are converted into 155, 220, and 110 by the second curve C2. The output R, G, and B values of the third pixel are converted into 100, 190, and 0 by the third curve C3.

That is, it can be seen that the RGB data is converted such that the amount of increase in brightness is larger as a pixel has a lower saturation and the amount of increase in brightness is smaller as a pixel has a higher saturation.

Again, details will be described with reference to FIG. 6.

The controller 170 may output an image with the converted RGB data (S40).

In summary, the controller 170 may perform conversion of the RGB data of an input image based on an RGB curve, and output an image with the converted RGB data. Different RGB curves may be applied to each pixel according to the saturation information of each of pixels of the input image.

Figure 8:
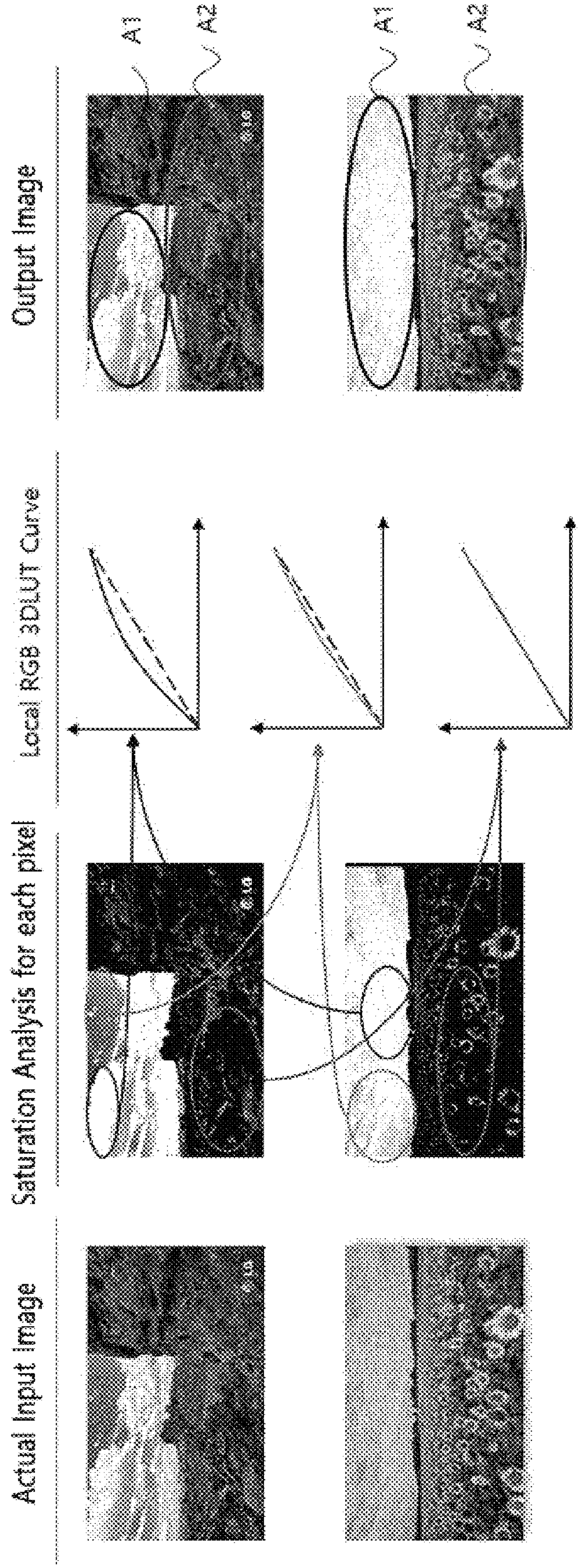
FIG. 8 is an exemplary diagram illustrating output of an image with RGB data converted by applying an RGB curve selected based on saturation information in a display device according to an embodiment of the present disclosure.

FIG. 8 is an exemplary diagram illustrating output of an image with RGB data converted by applying an RGB curve selected based on saturation information in a display device according to an embodiment of the present disclosure.

An actual input image of FIG. 8 represents an image output from the display device 100 without separately converting the RGB data of the input image.

Saturation analysis for each pixel may express the saturation information calculated based on the RGB data of the input image in black and white. The lower the saturation, the whiter it is, and the higher the saturation, the darker it is.

Local RGB 3DLUT Curve shows an example of RGB curves selected for each pixel according to saturation analysis. It can be seen that, as the lower the saturation, the more convex RGB curve is selected, and as the higher the saturation, the flatter RGB curve is selected.

The output image represents an output image by RGB data in which each pixel is converted by an RGB curve selected to correspond to a corresponding pixel. The first area A1 of FIG. 8 may be an area mainly composed of pixels with low saturation, and the second area A2 may be an area mainly composed of pixels with high saturation. It can be seen that the brightness of the first area A1 increases and the brightness of the second area A2 is almost similar to the input image when comparing the output image with the actual input image.

That is, according to the present disclosure, there is an advantage in that the brightness enhancement effect can be improved while minimizing the increase in power consumption by increasing the brightness of an image locally in a bright area without increasing the brightness in the whole area.

An algorithm for applying different RGB curves for pixels according to the above-described saturation information may use RGB data, and thus has an advantage of being applicable to most of the display devices 100. Specifically, image processing such as Local Contrast uses YUV data, so that the image processing is possible when the specifications of the display device 100 are high enough, resulting in limitation. On the other hand, since the present disclosure uses RGB data, there is an advantage in that the present disclosure is applicable regardless of the specifications of the display device 100.

Figure 9:
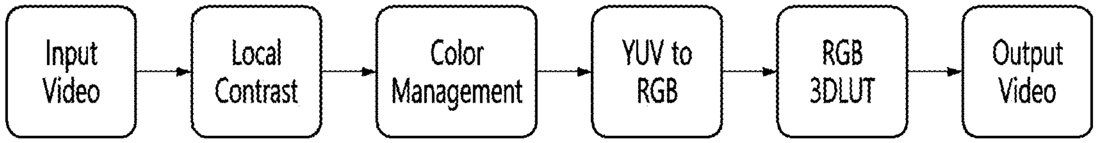
FIG. 9 is an exemplary diagram illustrating an operation of performing image processing in a display device.

FIG. 9 is an exemplary diagram illustrating an operation of performing image processing in a display device.

When receiving an image (Input Video), the display device 100 may perform image processing such as Local Contrast and Color Management. Local Contrast has been described in detail above, and redundant descriptions are omitted. Color Management may be image processing that an image is divided into areas and the color of the area is set to a color suitable for each area. The above image processing may be performed through YUV data.

Meanwhile, according to the present disclosure, RGB data is obtained from an input image or an image-processed image. When image processing is performed through YUV data, conversion into RGB data may be performed.

The controller 170 may perform conversion of RGB data by applying the RGB data to an RGB curve set for each pixel, and output an image using the converted RGB data (Output Video).

Figure 10:
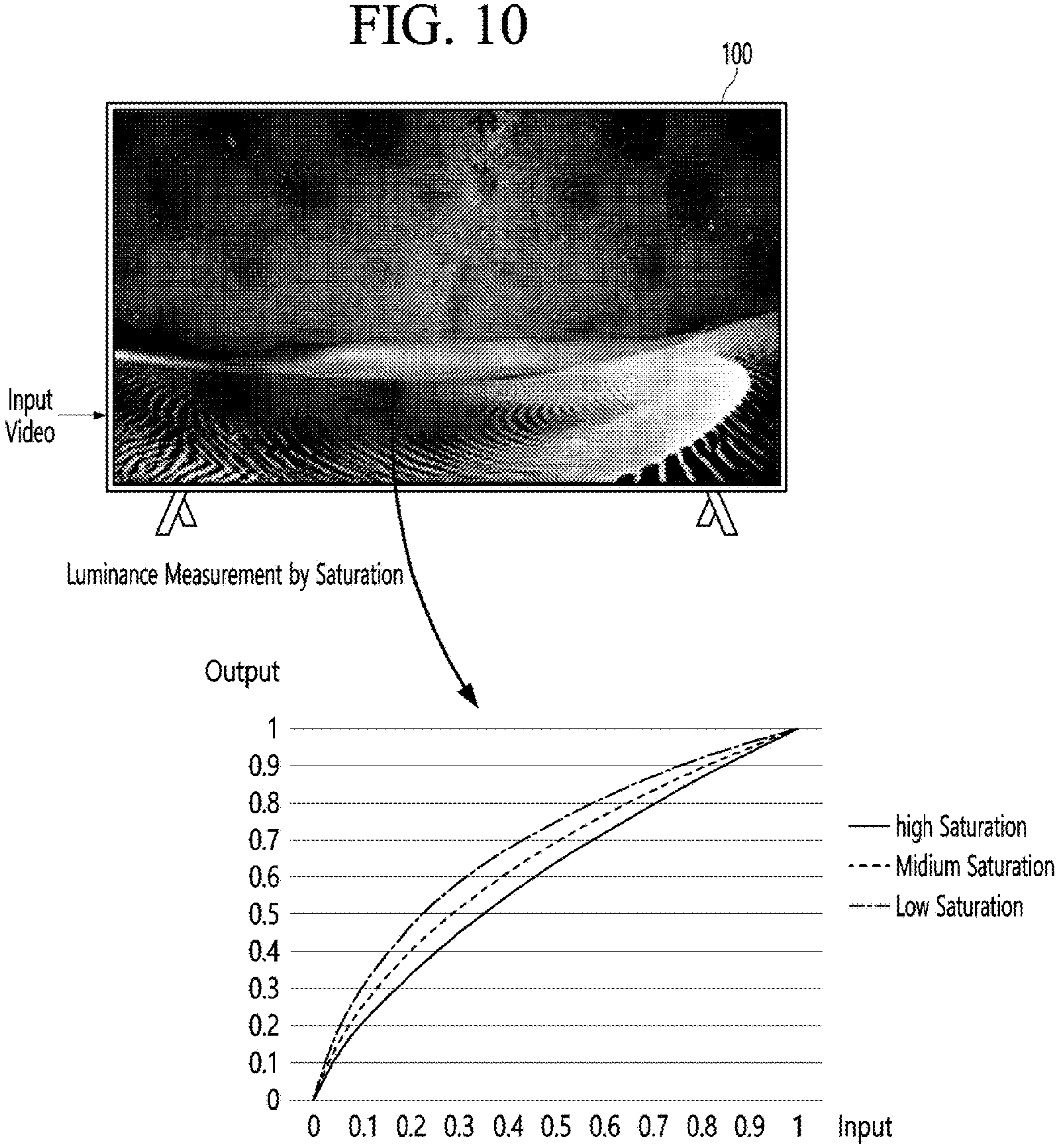
FIG. 10 is an exemplary view illustrating a graph showing a result of measuring luminance through an output image in a display device according to an embodiment of the present disclosure.

FIG. 10 is an exemplary view illustrating a graph showing a result of measuring luminance through an output image in a display device according to an embodiment of the present disclosure.

The display device 100 may receive an image through various paths such as HDMI. In particular, the display device 100 may receive images having various saturations.

The display device 100 according to an embodiment of the present disclosure may output an image by applying different RGB curves according to saturations. As a result of measuring the output of an image output from the display 180 using an external device (e.g., a luminance meter), a graph may be output on a PC or the like. In this case, the x-axis (horizontal axis) of the graph output from the PC or the like represents the luminance of an input image to the display device 100, and the y-axis (vertical axis) represents the measured luminance of an output image. Specifically, it can be seen that different outputs are measured according to the saturations with respect to the same input, and accordingly, it can be seen that the display device 100 outputs an image by applying different RGB curves according to the saturations.

In summary, the display device 100 according to an embodiment of the present disclosure may output an image having intensively enhanced brightness for a color signal with low saturation. The display device 100 may output an image in which the amount of increase in brightness of the output is larger compared to that of the input as the saturation decreases, and the amount of increase in brightness of the output is smaller compared to that of the input as the saturation increases.

The present disclosure has an advantage of outputting an image with the best brightness suitable for the image by changing the RGB curve in real time according to the image, rather than a fixed RGB curve.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

What is claimed is:

1. A display device comprising:

a controller configured to perform conversion of red green blue (RGB) data of an input image based on an RGB curve, the input image including a plurality of pixels; and a display configured to output an image with RGB data that has been converted based on the RGB curve, wherein the controller is further configured to apply pixel-specific RGB curves to each pixel of the plurality of pixels according to corresponding pixel-specific saturation information, wherein each of the pixel-specific RGB curves comprises one of:

an RGB curve that is convex upward as saturation of a corresponding pixel decreases based on an x-axis of the RGB curve being an input and a y-axis of the RGB curve being an output, or an RGB curve in which an output is higher than an input as saturation of a corresponding pixel decreases.

2. The display device of claim 1, wherein the controller is configured to calculate a saturation level for each pixel of the plurality of pixels with the pixel-specific saturation information so as to produce a pixel-specific saturation level, and apply the pixel-specific RGB curves according to the calculated pixel-specific saturation level.

3. The display device of claim 2, wherein, for each pixel of the plurality of pixels, the controller is configured to calculate the pixel-specific saturation value by dividing a maximum value by a minimum value among an R value, a G value, and a B value.

4. The display device of claim 3, wherein the pixel-specific RGB curves comprise a first RGB curve that is applied to a first pixel having a first saturation level as the pixel-specific saturation level and a second RGB curve that is applied to a second pixel having a second saturation level as the pixel-specific saturation level, and wherein an output of the first RGB curve is greater than an output of the second RGB curve when the first saturation level is lower than the second saturation level.

5. The display device of claim 2, wherein, for each pixel of the plurality of pixels, the controller is configured to calculate pixel-specific saturation level by dividing a minimum value by a maximum value among an R value, a G value, and a B value.

6. The display device of claim 1, wherein the controller is configured to output an image in which an amount of increase in brightness of an output is larger compared to that of an input as the saturation decreases, and the amount of increase in brightness of the output is smaller compared to that of the input as the saturation increases.

7. A display device comprising:

a controller configured to perform conversion of red green blue (RGB) data of an input image based on an RGB curve, the input image including a plurality of pixels; and a display configured to output an image with RGB data that has been converted based on the RGB curve, wherein the controller is further configured to apply pixel-specific RGB curves to each pixel of the plurality of pixels according to corresponding pixel-specific saturation information, and wherein the pixel-specific RGB curves comprise a first RGB curve whose output is higher than an input to a first pixel, and a second RGB curve whose output is the same as the input to a second pixel.

8. A method of controlling a display device that includes a controller and a display, the method comprising:

performing, by the controller of the display device, a conversion of red green blue (RGB) data of an input image based on an RGB curve, the input image including a plurality of pixels; and outputting, by the display of the display device, an image with RGB data that has been converted based on the RGB curve, wherein pixel-specific RGB curves are applied to each pixel of the plurality of pixels according to corresponding pixel-specific saturation information, wherein each of the pixel-specific RGB curves comprises one of:

an RGB curve that is convex upward as saturation of a corresponding pixel decreases based on an x-axis of the RGB curve being an input and a y-axis of the RGB curve being an output, or an RGB curve in which an output is higher than an input as saturation of a corresponding pixel decreases.

* * * * *